United States Patent
Urakami et al.

(10) Patent No.: US 9,076,466 B2
(45) Date of Patent: Jul. 7, 2015

(54) ASYMMETRIC TRAILING SHIELD WRITER FOR SHINGLED MAGNETIC RECORDING (SMR)

(71) Applicant: HGST Netherlands B.V., Amsterdam (NL)

(72) Inventors: Yosuke Urakami, Odawara (JP); Kazue Kudo, Odawara (JP); Hiromi Shiina, Hitachi (JP); Kaori Suzuki, Fujisawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/722,978

(22) Filed: Dec. 20, 2012

(65) Prior Publication Data

US 2014/0177091 A1    Jun. 26, 2014

(51) Int. Cl.
*G11B 5/127*    (2006.01)
*G11B 5/147*    (2006.01)
*G11B 5/23*    (2006.01)
*G11B 5/31*    (2006.01)

(52) U.S. Cl.
CPC ........... *G11B 5/232* (2013.01); *Y10T 29/49032* (2015.01); *G11B 5/1278* (2013.01); *G11B 5/3116* (2013.01)

(58) Field of Classification Search
USPC ............. 360/125.09, 125.13, 125.19, 125.25, 360/125.46, 125.51, 125.59, 125.64
See application file for complete search history.

(56) References Cited

U.S. PATENT DOCUMENTS

| | | |
|---|---|---|
| 6,185,063 B1 | 2/2001 | Cameron |
| 6,738,233 B2 | 5/2004 | Khizroev et al. |
| 6,795,277 B2 | 9/2004 | Tsuchiya et al. |
| 6,934,128 B2 | 8/2005 | Tsuchiya et al. |
| 6,967,810 B2 | 11/2005 | Kasiraj et al. |
| 7,322,095 B2 | 1/2008 | Guan et al. |
| 7,649,712 B2 | 1/2010 | Le et al. |
| 7,746,589 B2 | 6/2010 | Min et al. |
| 7,872,835 B2 | 1/2011 | Guan |
| 7,920,359 B2 | 4/2011 | Maruyama et al. |
| 8,035,930 B2 | 10/2011 | Takano et al. |
| 8,056,213 B2 | 11/2011 | Han et al. |
| 8,134,802 B2 | 3/2012 | Bai et al. |
| 8,310,786 B2 | 11/2012 | de la Fuente et al. |

(Continued)

FOREIGN PATENT DOCUMENTS

EP    1 521 261 A2    4/2005

OTHER PUBLICATIONS

Non-Final Office Action from U.S. Appl. No. 13/612,704 dated Jan. 18, 2013.

(Continued)

*Primary Examiner* — Adam B Dravininkas
(74) *Attorney, Agent, or Firm* — Zilka-Kotab, PC

(57) ABSTRACT

In one embodiment, a magnetic head includes a main pole adapted for producing a writing magnetic field, a trailing shield positioned on a trailing side of the main pole, wherein a trailing gap is positioned between the trailing shield and the main pole, and a side shield positioned on at least one side of the main pole in a cross-track direction, wherein a side gap is positioned between the side shield and the main pole, wherein the main pole has an asymmetrical shape at an air bearing surface (ABS) thereof. In another embodiment, a method may be employed for forming a magnetic head having a main pole that has an asymmetrical shape at an ABS thereof.

15 Claims, 13 Drawing Sheets

Type 3

(56) References Cited

U.S. PATENT DOCUMENTS

| | | | |
|---|---|---|---|
| 8,792,210 | B2 | 7/2014 | de la Fuente et al. |
| 2001/0017751 | A1 | 8/2001 | Miyazaki et al. |
| 2001/0055181 | A1* | 12/2001 | Kim et al. .................... 360/125 |
| 2003/0133213 | A1 | 7/2003 | Rubin et al. |
| 2005/0069298 | A1 | 3/2005 | Kasiraj et al. |
| 2005/0071537 | A1 | 3/2005 | New et al. |
| 2005/0118329 | A1* | 6/2005 | Kamijima .................... 427/127 |
| 2006/0232888 | A1 | 10/2006 | Satoh et al. |
| 2006/0262453 | A1 | 11/2006 | Mochizuki et al. |
| 2007/0206323 | A1 | 9/2007 | Im et al. |
| 2008/0174911 | A1* | 7/2008 | Toma et al. ............. 360/125.19 |
| 2008/0180861 | A1 | 7/2008 | Maruyama et al. |
| 2008/0273276 | A1 | 11/2008 | Guan |
| 2009/0002896 | A1* | 1/2009 | Mallary et al. ................ 360/319 |
| 2009/0067078 | A1 | 3/2009 | Min et al. |
| 2009/0091861 | A1 | 4/2009 | Takano et al. |
| 2009/0251821 | A1* | 10/2009 | Song et al. .................... 360/110 |
| 2011/0058277 | A1* | 3/2011 | de la Fuente et al. ......... 360/122 |
| 2011/0085266 | A1 | 4/2011 | Kanai et al. |
| 2011/0102942 | A1* | 5/2011 | Bai et al. ................. 360/125.03 |
| 2011/0242707 | A1 | 10/2011 | Yoon et al. |
| 2011/0249359 | A1* | 10/2011 | Mochizuki et al. ............. 360/75 |
| 2011/0261485 | A1 | 10/2011 | Pentek et al. |
| 2011/0310511 | A1* | 12/2011 | Edelman et al. ......... 360/123.37 |
| 2013/0016443 | A1 | 1/2013 | de la Fuente et al. |

OTHER PUBLICATIONS

Final Office Action from U.S. Appl. No. 13/612,704 dated Jun. 5, 2013.

Non-Final Office Action from U.S. Appl. No. 13/612,704 dated Sep. 27, 2013.

Tagawa et al., "Minimization of erase-band in shingled PMR with asymmetric writer," 2010 Elsevier, B.V., Journal of Magnetism and Magnetic Materials, vol. 324, Dec. 2, 2010, pp. 324-329.

Bashir et al., "Head and bit patterned media optimization at areal densities of 2.5 Tbit/in2 and beyond," 2010 Elsevier B.V., Journal of Magnetism and Magnetic Materials, vol. 324, Nov. 25, 2010, pp. 269-275.

U.S. Appl. No. 13/612,704 filed on Sep. 12, 2012.

Election/Restriction Requirement from U.S. Appl. No. 12/556,472 dated Jan. 17, 2012.

Non-Final Office Action from U.S. Appl. No. 12/556,472 dated Mar. 5, 2012.

Notice of Allowance and Fee(s) Due from U.S. Appl. No. 12/556,472 dated Jul. 13, 2012.

Wood et al., "The Feasibility of Magnetic Recording at 10 Terabits Per Square Inch on Conventional Media," 2009 IEEE, IEEE Transactions on Magnetics, vol. 45, No. 2, Feb. 2009, pp. 917-923.

Jaquette, G.A., "LTO: A better format for mid-range tape," 2003 IBM, IBM Journal of Res. & Dev., vol. 47, No. 4, Jul. 2003, pp. 429-444.

Non-Final Office Action from U.S. Appl. No. 13/612,704, dated Sep. 27, 2013.

Final Office Action from U.S. Appl. No. 13/612,704, dated Feb. 5, 2014.

Notice of Allowance from U.S. Appl. No. 13/612,704, dated Mar. 18, 2014.

* cited by examiner

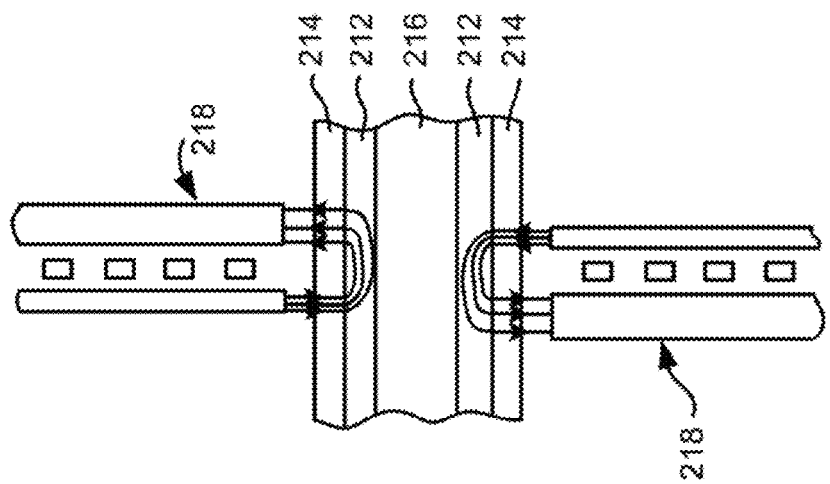
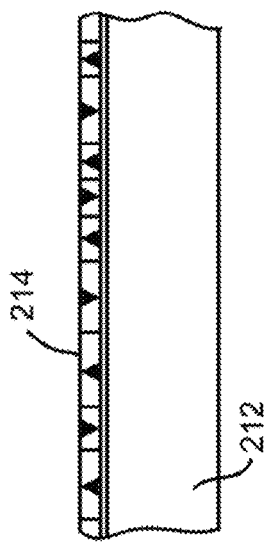
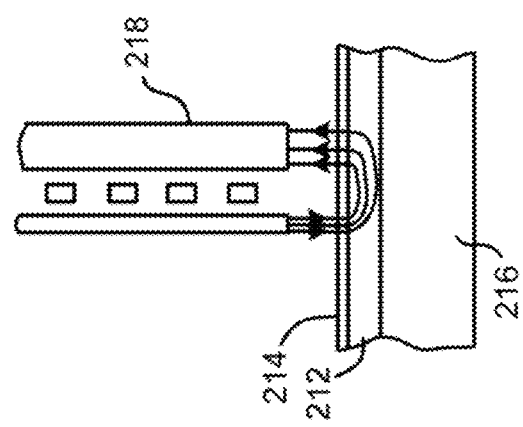
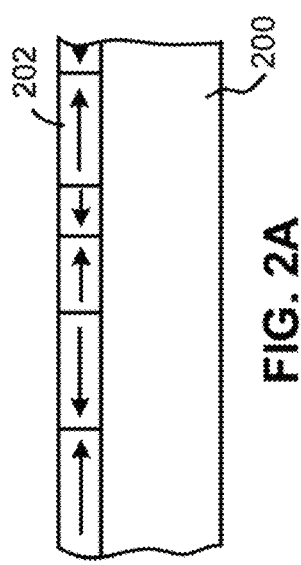
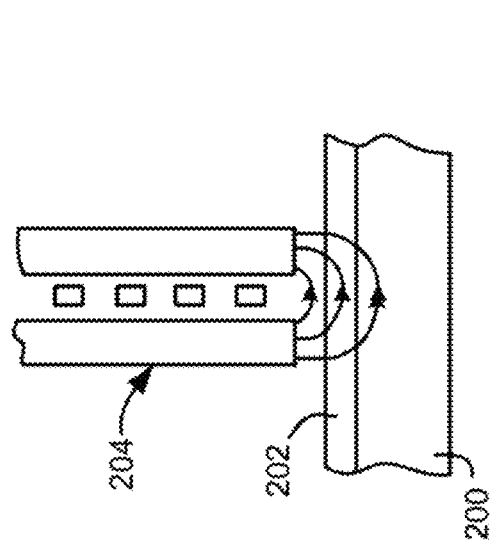

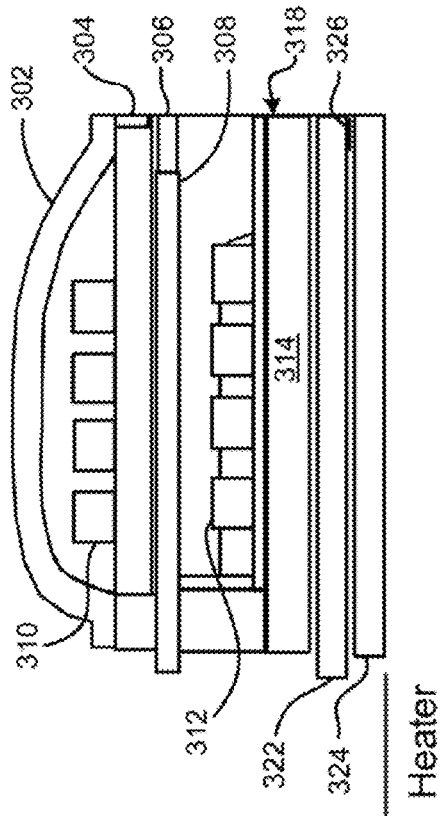
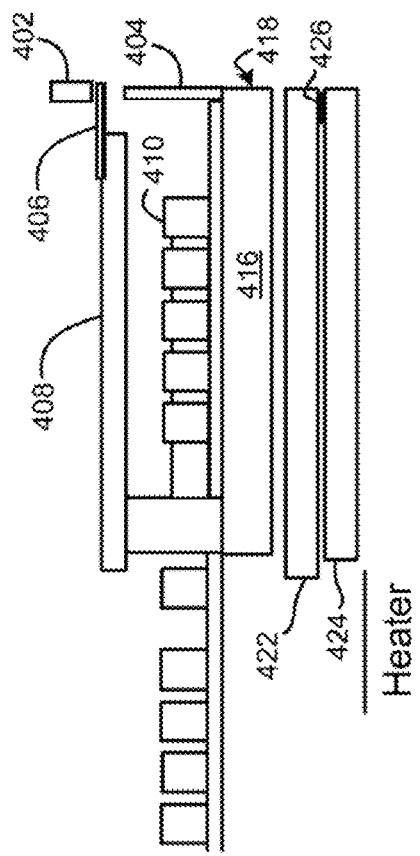
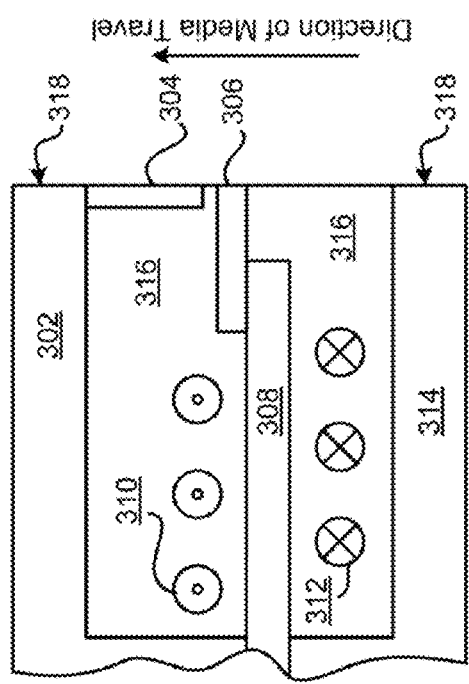
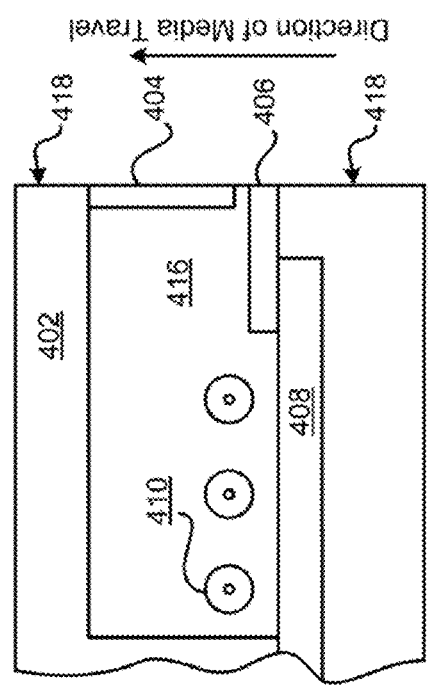

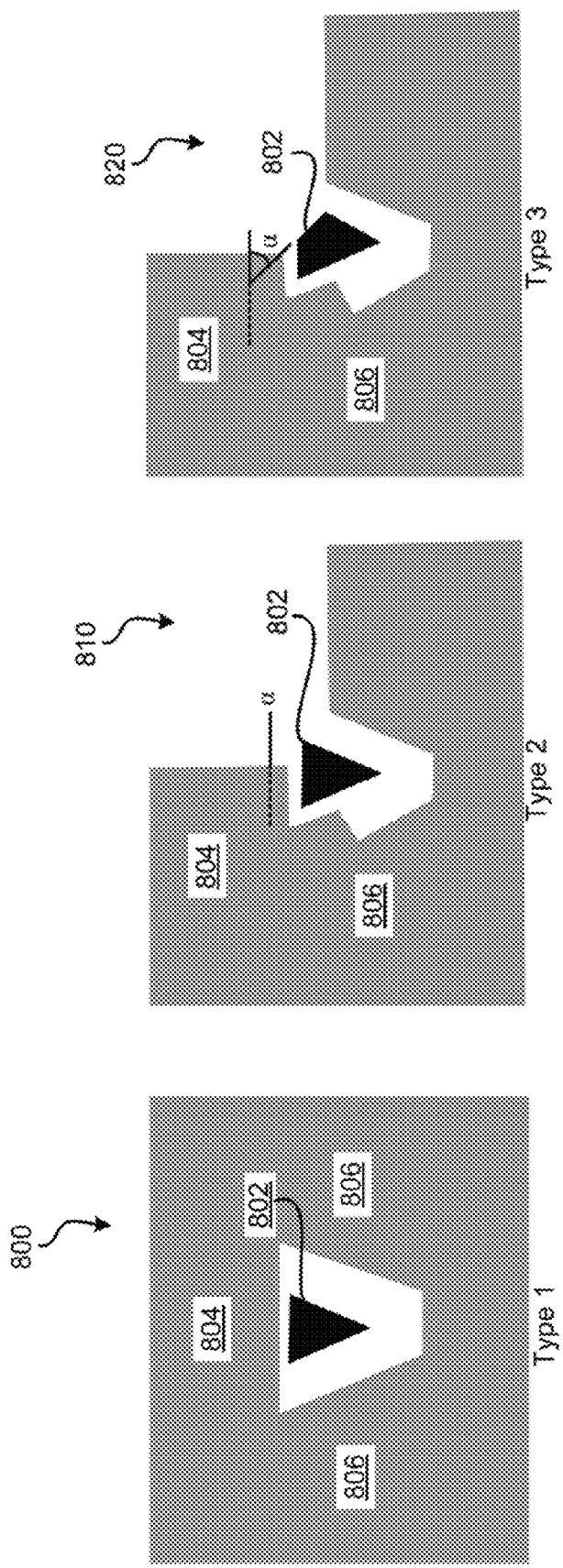

ASYMMETRIC TRAILING SHIELD WRITER FOR SHINGLED MAGNETIC RECORDING (SMR)

FIELD OF THE INVENTION

The present invention relates to data storage systems, and more particularly, this invention relates to a perpendicular magnetic recording head structure having an asymmetric trailing shield for use in a shingled magnetic recording (SMR) system.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating, disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing, rapidly. In particular, it is desired that HDDs be able to store more information in their limited area and volume. A technical approach to this desire is to increase the capacity by increasing the recording density of the HDD. To achieve higher recording density, further miniaturization of recording hits is effective, which in turn typically requires the design of smaller and smaller components.

Recently, Shingled Magnetic Recording (SMR) has been designed to be used as a recording method for improving areal density. An example of SMR is shown in FIG. 5. In this method, tracks are recorded overlapping, in as tile-like manner. As a result, tracks which are actually read out are recorded using an edge of a main pole, and the recording characteristics at the edge of the main pole are therefore more important than in other areas of the main pole. In other words, it is useful to improve the field gradient in the cross-track direction and the field gradient in the down-track direction, specifically at track edges of the main pole. Up to now, with regard to the recording characteristics at track edges, attempts have been made to increase the field gradient by reducing the side gap 602 on a side of the main pole 604, an example of which is provided in FIG. 6. However, when the side gap 602 is simply reduced, a problem is encountered in that the intensity of the magnetic field is insufficient because it is absorbed by a side shield, and as a result it is not possible to obtain the desired field gradient.

Accordingly, it would be beneficial to have a recording system where the cross-track gradient and the down-track gradient at track edges of a main pole are increased while limiting, the corresponding decline in field intensity at the track edges to a minimum

SUMMARY

In one embodiment, a magnetic head includes a main pole adapted for producing a writing magnetic field, a trailing shield positioned on a trailing side of the main pole, wherein a trailing gap is positioned between the trailing shield and the main pole, and a side shield positioned on at least one side of the main pole in a cross-track direction, wherein a side gap is positioned between the side shield and the main pole, wherein the main pole has an asymmetrical shape at an air bearing surface (ABS) thereof.

in another embodiment a method for forming a magnetic head includes forming a main pole adapted for producing a writing magnetic field, forming a trailing gap on a trailing side of the main pole, forming a trailing shield on a trailing side of the trailing gap, forming a side gap on a side of the main pole in a cross-track direction, and forming a side shield on at least one side of the side gap in the cross-track direction, wherein the main pole has an asymmetrical shape at an ABS thereof.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in con unction with the accompanying drawings.

FIG. 2A is a schematic representation in section of a recording medium utilizing, a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

FIG. 8A is a schematic diagram showing a portion of a magnetic head from an ABS thereof, according to the prior art.

FIG. 8B is a schematic diagram showing a portion of a magnetic head from an ABS thereof, according to one embodiment.

FIG. 8C is a schematic diagram showing a portion of a magnetic head from an ABS thereof according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk based storage systems and/or related systems and methods, as well as operation and/or component parts thereof.

In one general embodiment, a magnetic head includes a main pole adapted for producing a writing magnetic field, a trailing shield positioned on a trailing side of the main pole, wherein a trailing gap is positioned between the trailing shield and the main pole, and a side shield positioned on at least one side of the main pole in a cross-track direction, wherein a side gap is positioned between the side shield and the main pole, wherein the main pole has an asymmetrical shape at an air bearing surface (ABS) thereof.

In another general embodiment, a method for forming a magnetic head includes forming a main pole adapted for producing a writing magnetic field, forming a trailing, gap on a trailing side of the main pole, forming a trailing shield on a trailing side of the trailing gap, forming a side gap on a side of the main pole in a cross-track direction, and forming a side shield on at least one side of the side gap in the cross-track direction, wherein the main pole has an asymmetrical shape at an ABS thereof.

Figure 1:
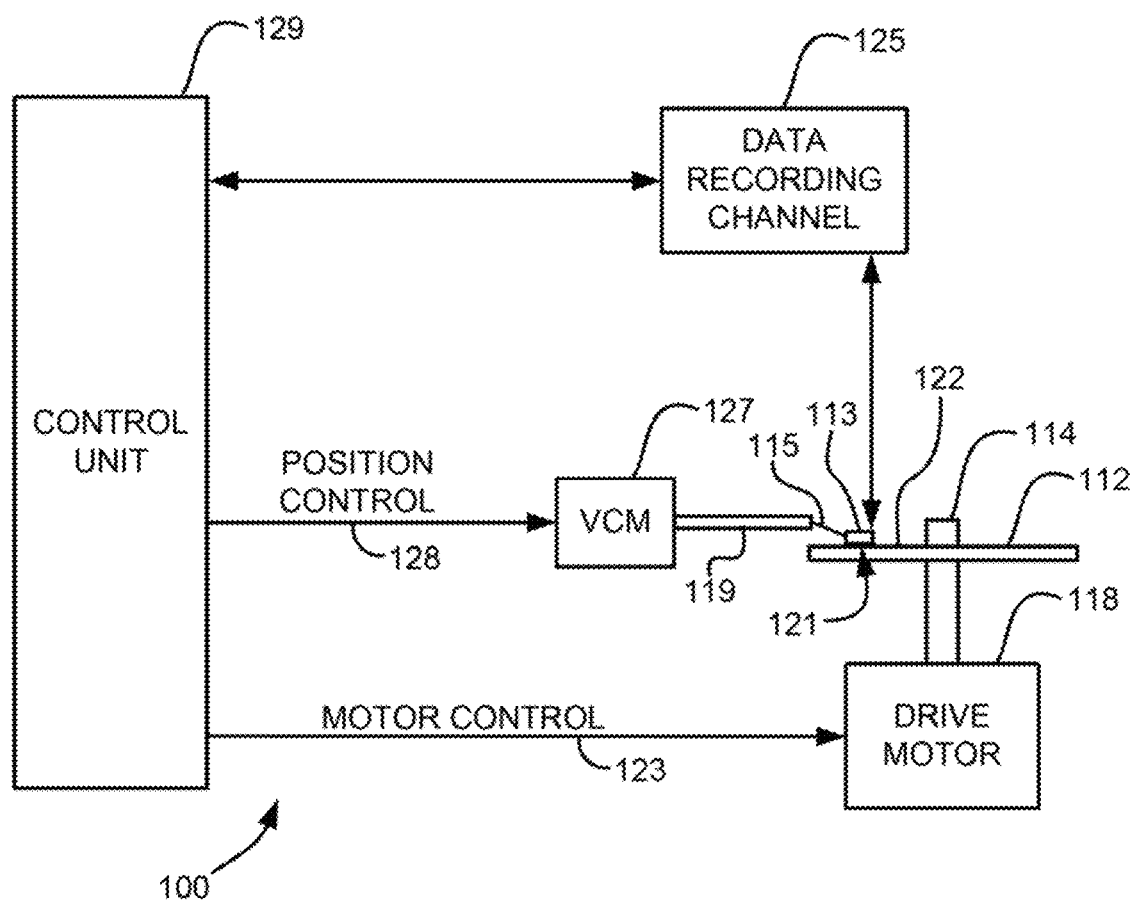
FIG. 1 is a simplified drawing of a magnetic recording disk drive system.
Figure 5:
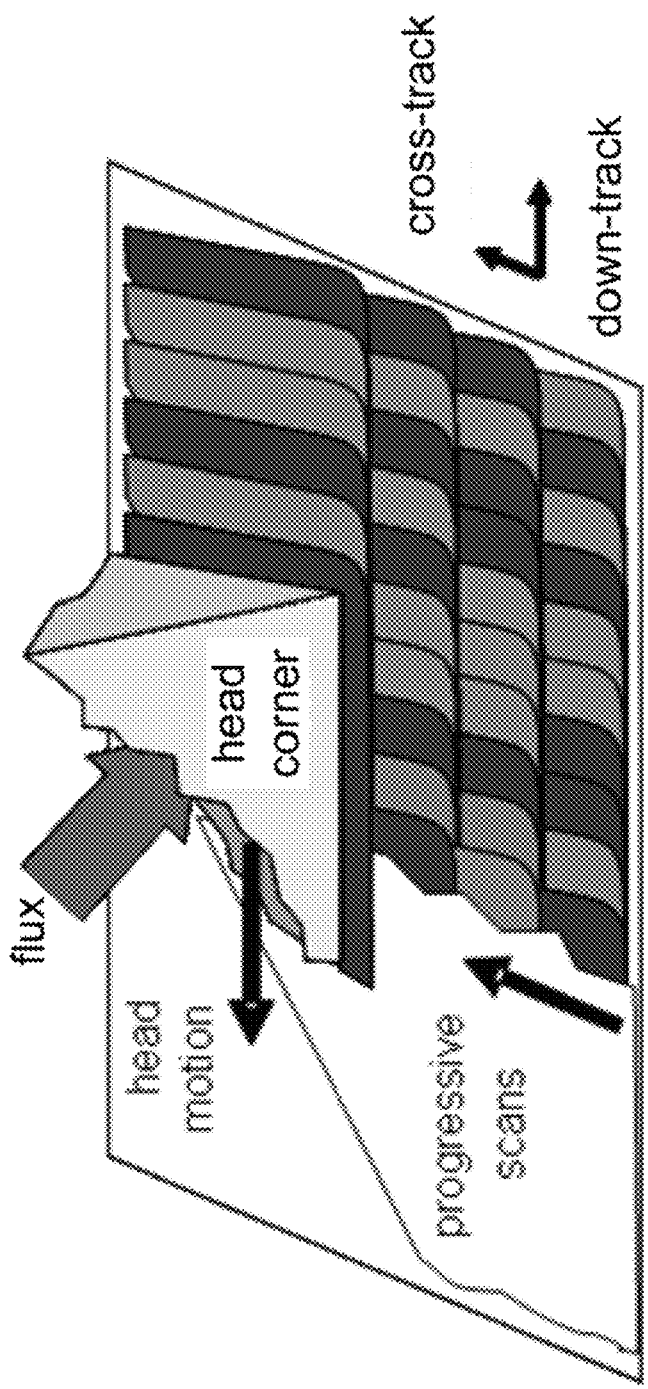
FIG. 5 is a schematic diagram showing shingled magnetic recording (SMR), according to the prior art.
Figure 6:
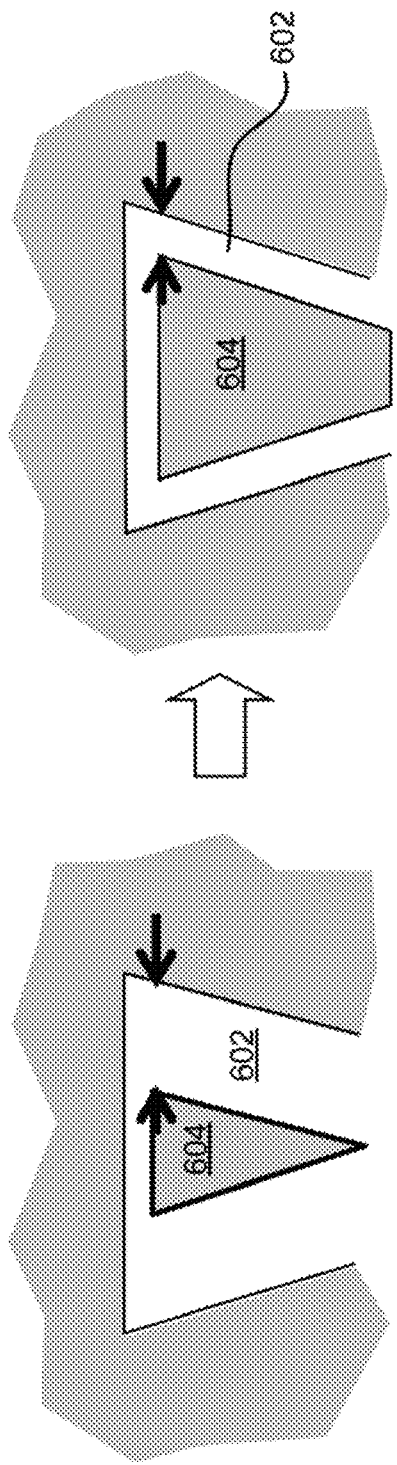
FIG. 6 is a diagram showing a reduced side gap, according to the prior art.

Referring now to FIG. 1, there is shown a disk drive 100 in accordance with one embodiment of the present invention. As shown in FIG. 1, at least one rotatable magnetic disk 112 is supported on a spindle 114 and rotated by a drive mechanism, which may include a disk drive motor 118. The magnetic recording on each disk is typically in the form of an annular pattern of concentric data tracks (not shown) on the disk 112.

At least one slider 113 is positioned near the disk HZ, each slider 113 supporting one or more magnetic read/write beads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises as coil movable, within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an ABS of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has as pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording, systems, such as that shown in FIG. 1. This medium is utilized for recording, magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative, relationship between a perpendicular head 218 and a recording medium. The recording medium illustrated in FIG. 2O includes both the high permeability under layer 212 and the overlying, coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coming 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (PI) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have, a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Figure 7:
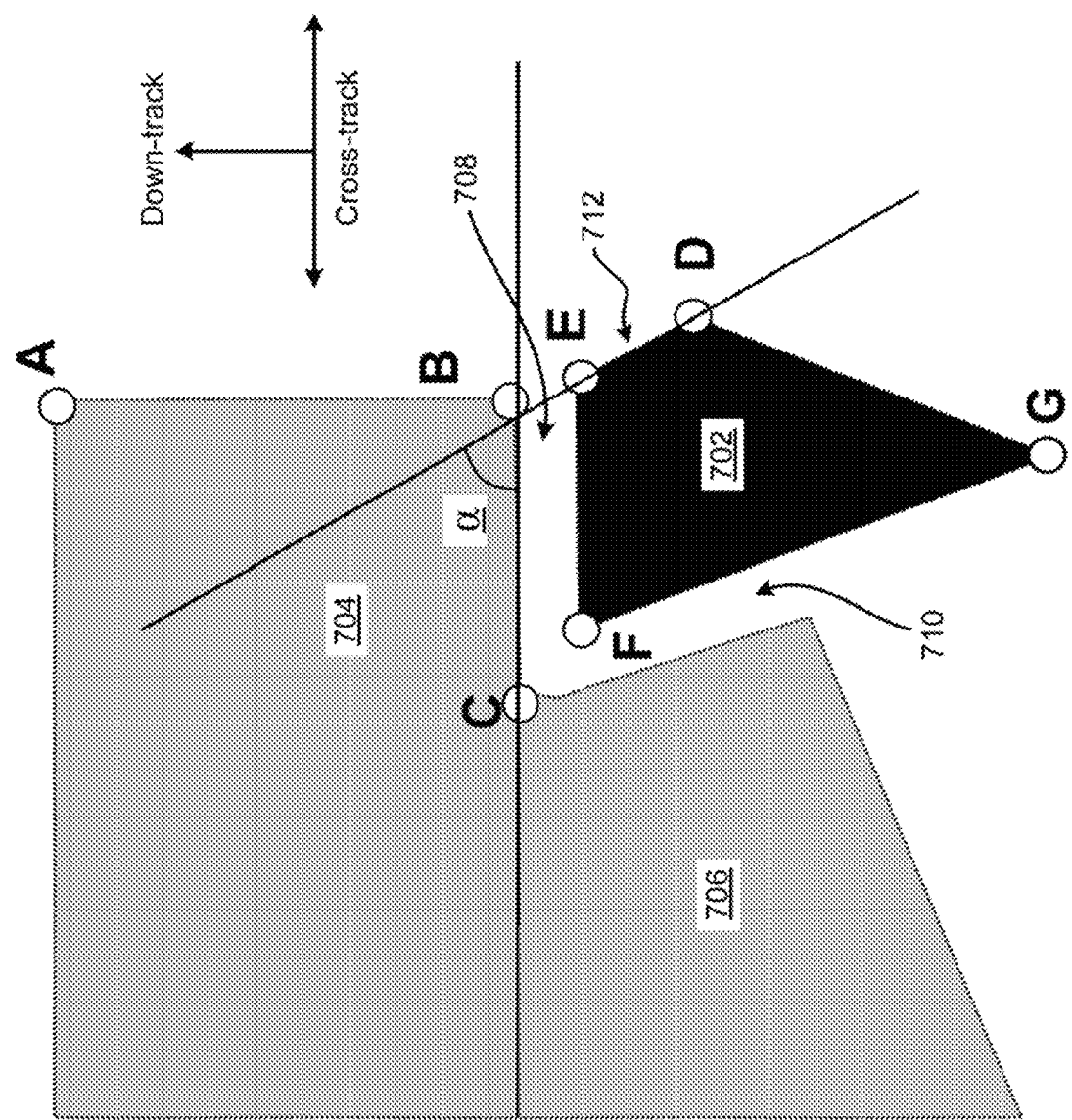
FIG. 7 is a schematic diagram showing a portion of a magnetic head from an air bearing surface (ABS) thereof, according to one embodiment.

Referring now to FIG. 7, a portion of a perpendicular magnetic recording head 700 is shown, according to one embodiment, which may be provided with a main pole 702, a trailing shield 704, and a side shield 796 with respect to the main pole 792, wherein a trailing side of the main pole 702 (the side defined by between points E and F) and the trailing shield 704 are asymmetrical, and wherein a relationship represented by the following expression is established at an ABS of the magnetic head 700: $0°<\alpha<90°$, where $\alpha$ is an angle between a line (the hue between points B and C parallel to the trailing edge of the main pole 702 and a shaped corner (between points SE and D) of the main pole 702.

Points A and B denote the leading edge of the trailing shield 704, point C denotes a point where the trailing shield 704 and the side shield 706 intersects, points E and F denote the trailing edge of the main pole 702 facing the trailing shield 704, and point D denotes another main pole 702 edge adjacent to point E. $\alpha$ is defined as the angle between a line that passes through points C and B and a line that passes through points. E and D. Furthermore, the trailing shield 704 is positioned such that it does not exist at all locations on the trailing side of the main pole 702, such that the line that passes through points A and B, which defines an end of the trailing shield 704 in a down-track direction, is characterized by intersecting the main pole 702. In a head that satisfies these conditions, the main pole edge (at point D) at the side where there is no shield is positioned further away from a center of the main pole 702 than the trailing shield 704 edge (at point B) proximate to the main pole 702.

According to one embodiment, a magnetic head comprises a main pole 702 adapted for producing a writing magnetic field, a trailing shield 704 positioned on a trailing side of the main pole 702, wherein a trailing gap 708 is positioned between the trailing shield 704 and the main pole 702, a side shield 706 positioned on at least one side of the main pole 702 in a cross-track direction, with a side gap 710 being positioned between the side shield 706 and the main pole 702. The main pole 702 has an asymmetrical shape at an ABS thereof, as shown in FIG. 7.

According to one embodiment, the angle α at the ABS between a leading edge of the trailing shield 704 and a shaped edge 712 of the main pole 702 (between point E and point D) is greater than 0° and less than about 90°, for example, between about 30° and about 60° at the ABS, e.g., about 45° at the ABS.

In another approach, the shaped edge 712 may be located between a trailing edge (between point F and point E) of the main pole 702 and a side edge (between point D and point G) of the main pole 702.

According to one embodiment, a corner (point E) of the main pole 702 at the ABS between the trailing edge (between point F and point E) and the shaped edge 712 (between point D and point E) of the main pole 702 is positioned farther from a center of the main pole 702 in a track-width direction than an edge of the trailing shield 704 on a side thereof (between point A and point B) nearest to the shaped edge 712 of the main pole 702.

In another embodiment, a line extending along an edge of the trailing shield 704 on a side thereof (between point A and point B, and as shown, oriented in more of a down-track direction than a cross-track direction) at the ABS nearest to the shaped edge 712 of the main pole 702 intersects with the main pole 702.

In yet another embodiment, an edge of the trailing shield 704 on a side thereof (between point A and point B) nearest to the shaped edge 712 of the main pole 702 does not extend beyond the main pole 702 in a cross-track, direction.

A magnetic data storage system, such as that shown in FIG. 1 according to one embodiment, comprises at least one magnetic head as described above in any embodiment, a magnetic medium, a drive mechanism for passing the magnetic medium over the at least one magnetic head, and a controller electrically coupled to the at least one magnetic head for controlling operation of the at least one magnetic head.

Referring now to FIGS. 8A-8C, various structures were evaluated in terms of head field characteristics. Structure 800 (Type 1) shown in FIG. 8A is a prior art structure having side shields 806, trailing shield 804, and main pole 802. In the structure 810 shown in FIG. 8B (Type 2), α=0°, and α=45° in structure 820 shown in FIG. 8C (type 3). With regard to the head constructions in these types, the finite element method (FEM) was used to measure the track pitch center gradient, the field gradient at the track edge, and the field gradient in the cross-track direction with different types of media.

Figure 13:
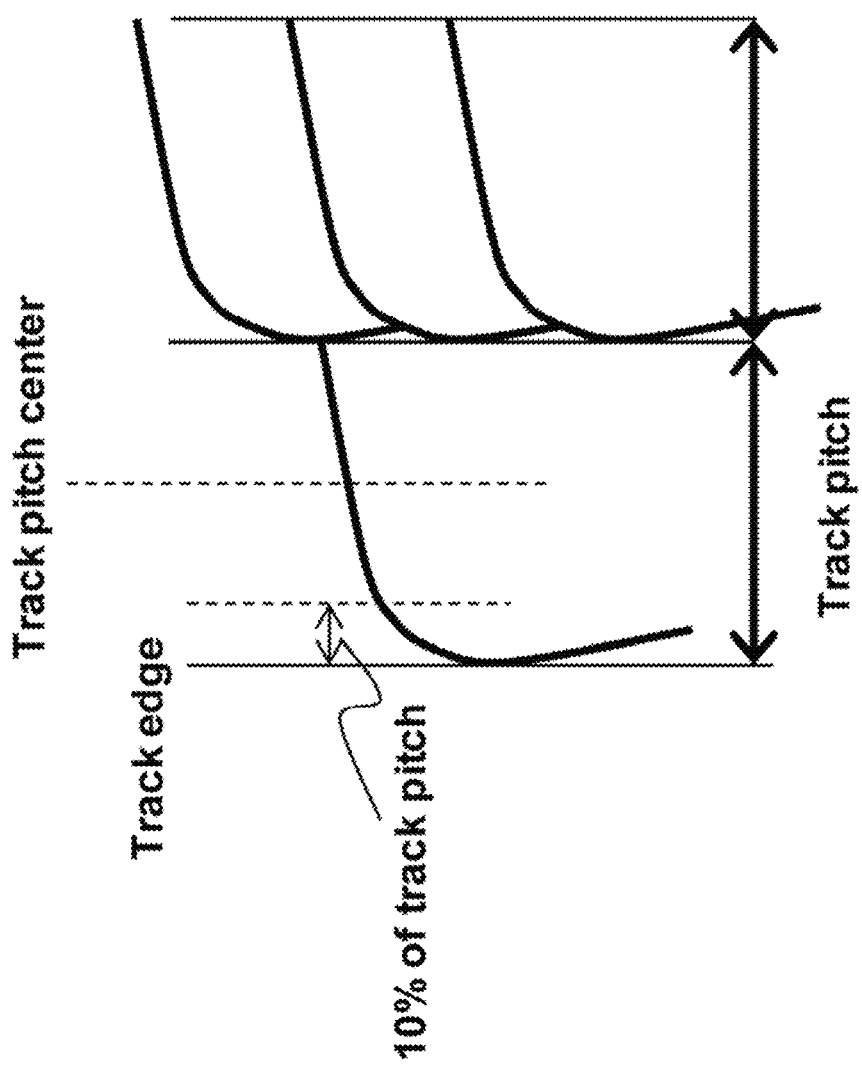
FIG. 13 shows a definition of field gradient evaluation points in a SMR system.

Definitions for the track edge and track pitch center are shown in FIG. 13. The track pitch was set to 52 nm in these calculations. The main pole 802 comprised an FeCo alloy and the main pole width was 90 nm (between point F and point E in FIG. 7), and, as shown in FIGS. 8A-8C, the trailing shield 804 and side shield 806 comprised an FeNi alloy. The trailing shield gap length was 20 nm, the distance between the main pole 802 and the backing layer of a perpendicular recording media was 47 nm, and the magnetic field evaluation point was taken as 15 nm from the ABS of the main pole 802. In addition, the magnetic field was evaluated using three types of media having different switching field intensities.

Figure 9A:
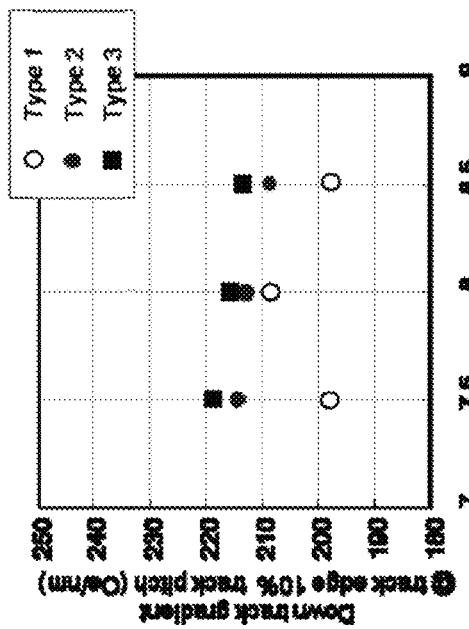
FIG. 9A is a plot showing a down-track field gradient at a track pitch center of devices according to various embodiments.

FIG. 9A shows the medium dependency of the field gradient at the track pitch center. The field gradient in the conventional structure of Type 1 deteriorated to a greater extent than in Type 2 and Type 3 across all media. Furthermore, it is clear that it is possible to obtain a more favorable down-track field gradient with Type 3 when Type 2 and Type 3 are compared.

Figure 9B:
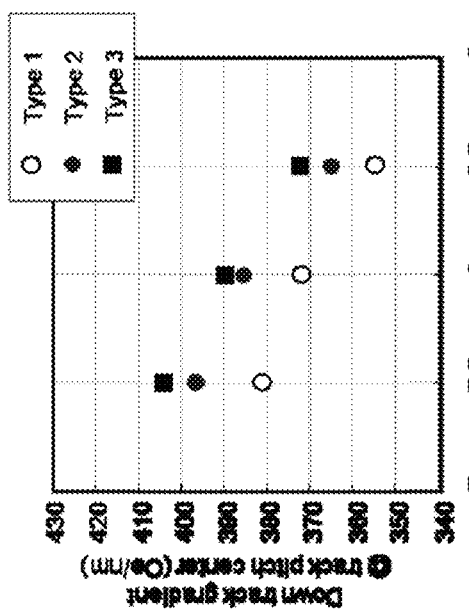
FIG. 9B is a plot showing the down-track field gradient at a track edge of devices according to various embodiments.
Figure 9C:
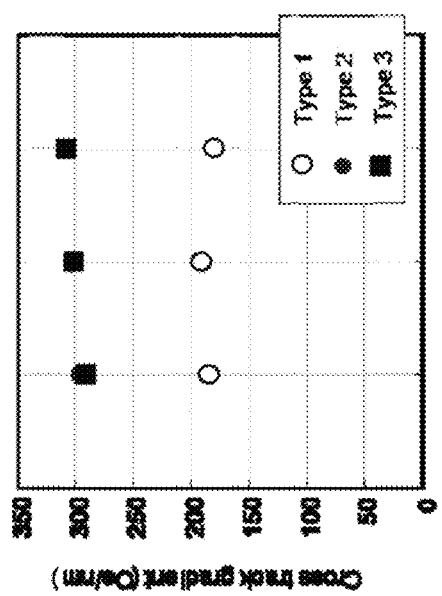
FIG. 9C is a plot showing a cross-track field gradient of devices according, to various embodiments.

FIG. 9B shows the down-track gradient at the track edge. In this case also it is clear that it is possible to achieve a higher field gradient with Type 3 than with Type 1. The same trend is apparent with respect to the cross-track gradient, and it is possible to confirm that there is an improvement in the field gradient with the Type 2 and Type 3 constructions regardless of the media (as shown in FIG. 9C). This indicates that with the Type 3 construction it is possible to improve the field gradient in both the cross-track and down-track directions, and that the Type 3 construction can realize a HDD having a higher areal density than a head according to the Type 1 or Type 2 construction.

Figure 10:
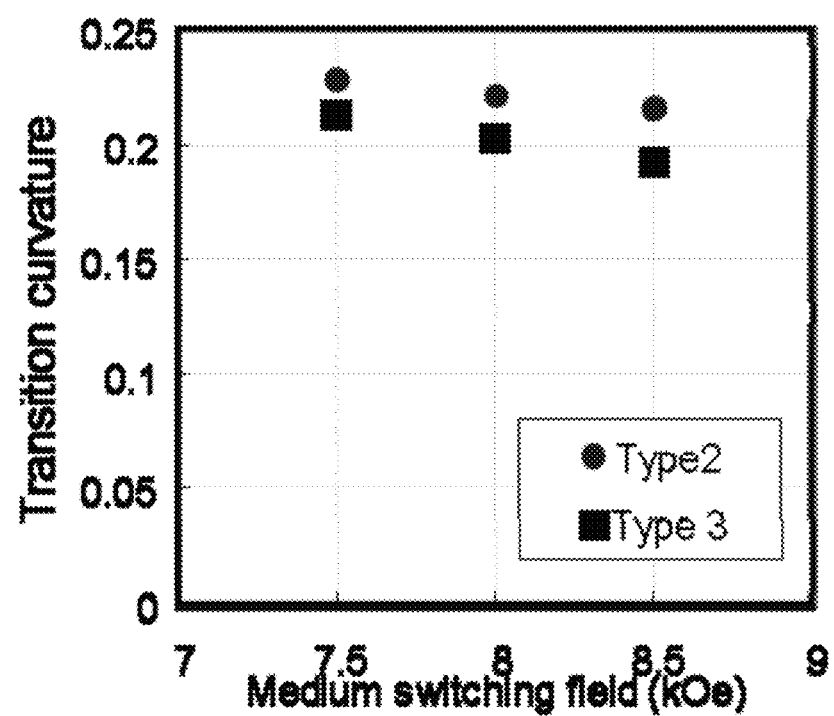
FIG. 10 is a plot showing a transition curvature of devices according to several embodiments.

Furthermore, transition curvature, which is an index of recording quality, was evaluated for the Type 2 and Type 3 constructions, as shown in FIG. 10. When the curvatures are compared, Type 3 has a transition curvature which is 10% less than that of Type 2. In Type 2, even though the volume of the trailing shield decreased, the volume of the pole did not change which caused trailing shield saturation, and consequently an excessive magnetic field was discharged from the pole. It is thought that this leads to write blur and a decline in the transition curvature. It is expected that write blur may be limited by removing the edge of the main pole. Accordingly, in one embodiment, α is greater than 0°, such as 10°, 15°, 20°, 30°, 45°, 50°, etc.

The gain in areal density for the head according to the embodiments described herein was obtained and measured using a simulation when compared with a conventional structure. The SNR improved by 1 dB due to an improvement in the cross-track gradient and the field gradient in the down-track direction. When this gain is totaled, an improvement in areal density of approximately 10% may be expected.

Figure 11C:
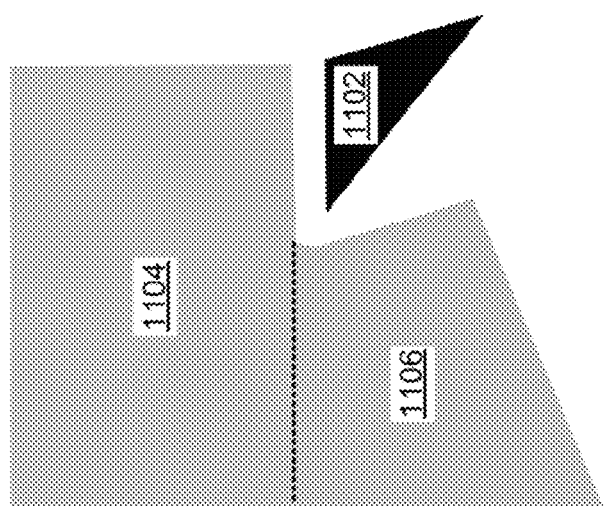
FIG. 11C is a schematic diagram showing a portion of a magnetic head from an ABS thereof, according to one embodiment.
Figure 11B:
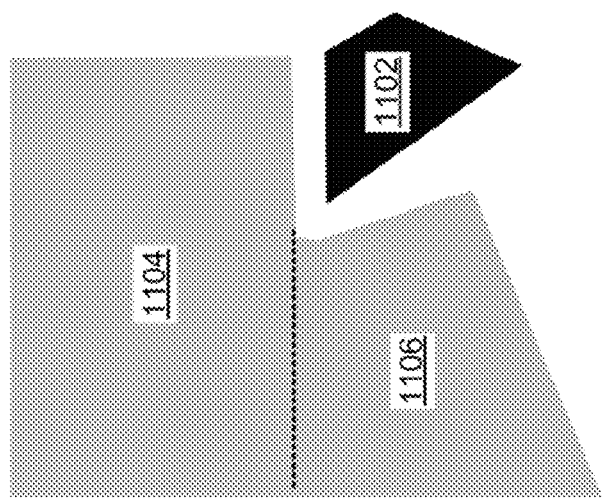
FIG. 11B is a schematic diagram showing a portion of a magnetic head from an ABS thereof, according to one embodiment.
Figure 11A:
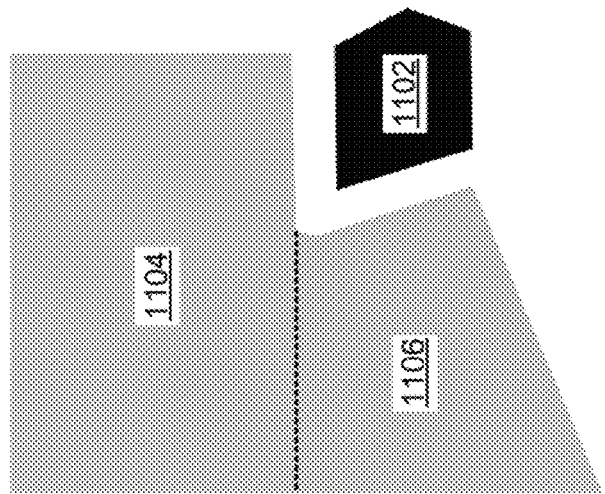
FIG. 11A is a schematic diagram showing a portion of a magnetic head from an ABS thereof, according to one embodiment.
Figure 12:
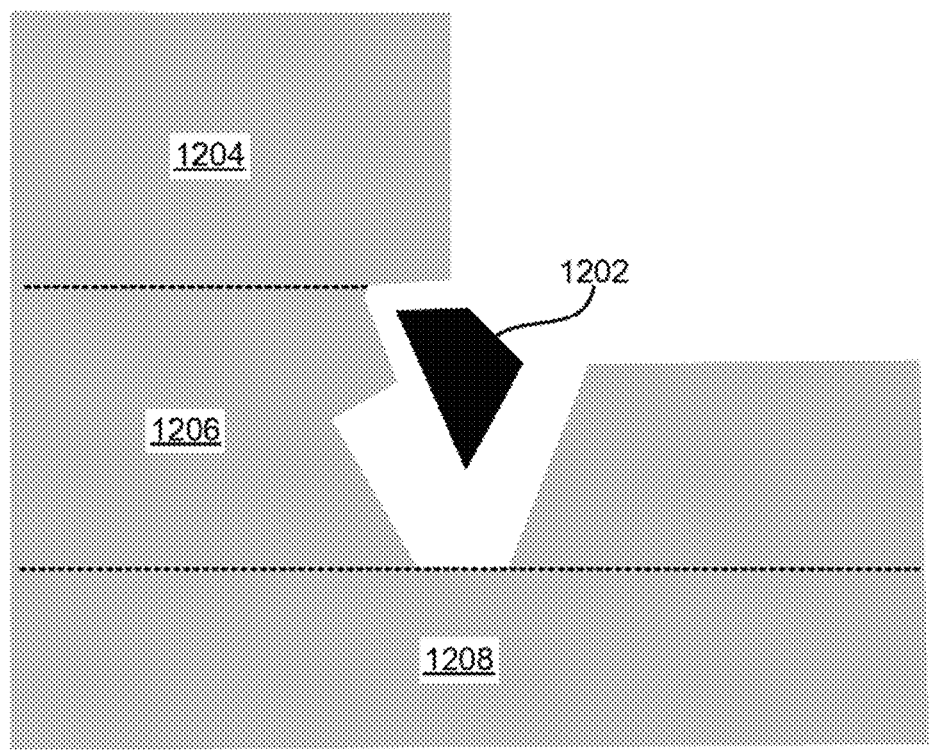
FIG. 12 is a schematic diagram showing a portion of a magnetic head from an ABS thereof, according to one embodiment.

With regard to the shape of the main pole, FIGS. 11A-11C are referenced, and the same improvements over conventional structures may be anticipated with a shape in which the leading shield side of the main pole 1102 is parallel with the leading side of the trailing shield 1104, as shown in FIG. 11A, a shape in which the side shield 1106 and the main pole 1102 are not parallel with each other, as shown in FIG. 11B, and a shape in which the main pole 1102 is triangular, as shown in FIG. 11C. In addition, with regard to the shape of the side shield, it was possible to confirm the same improvements with a construction comprising a trailing shield 1204, side shields 1206 and a leading shield 1208, as shown in FIG. 12. The shape of the trailing edge of the main pole 1202 may also have an inclined shape as shown.

As an index for evaluating the effect of the structures described herein according to various embodiments, the head field distribution obtained using an electromagnetic field simulation according to the FEM was evaluated. The down-track field gradient in the center of a predetermined track pitch and the down-track gradient and cross-track gradient at the track edge defined at a position 10% from the track edge are important as an index of the head field for increasing the SNR when shingled recording is performed, and these three points (as shown in FIG. 13) were evaluated. In the bead structure described herein, it is possible to improve both the down-track field gradient and cross-track field gradient at the track center and track edge.

A head having the proposed structure was applied to a SMR system and the areal density gain was calculated, and by improving both the cross-track and down-track gradients it was possible to improve the areal density by about 10%.

Figure 14:
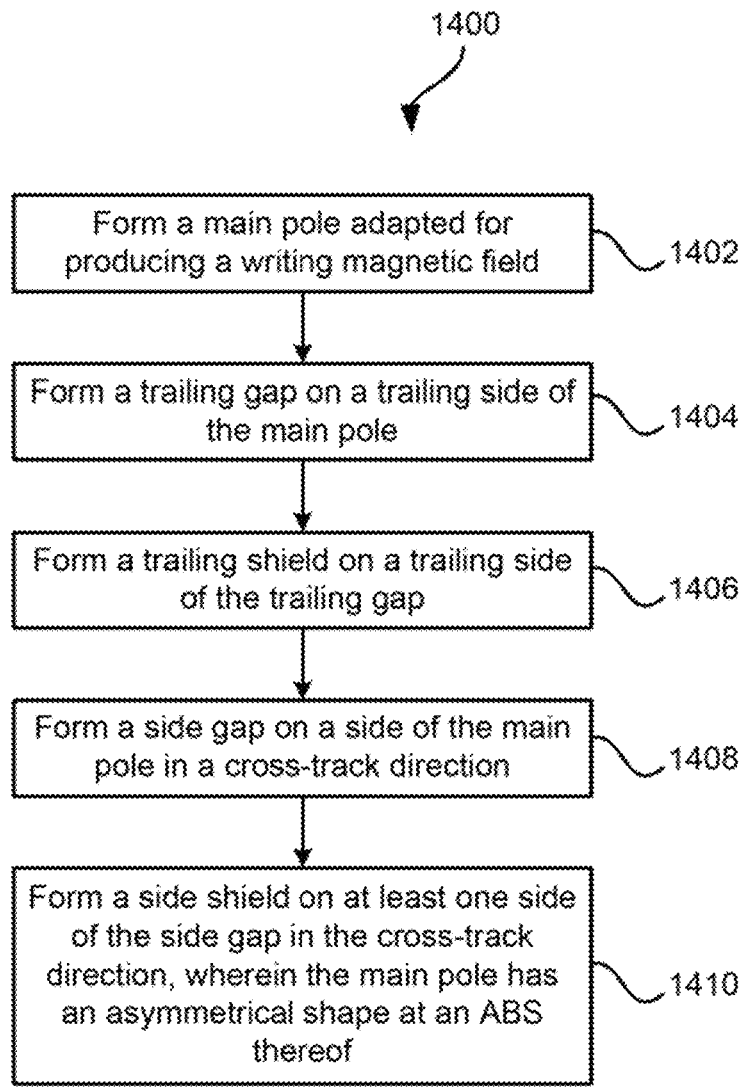
FIG. 14 shows a flowchart of a method, according to one embodiment.

FIG. 14 shows a method 1400 for forming a magnetic head, in accordance with one embodiment. As an option, the present method 11400 may be implemented to construct structures such as those shown in FIGS. 1-13. Of course, however, this method 1400 and others presented herein may be used to form magnetic structures for a wide variety of devices and/or purposes which may or may not be related to magnetic recording. Further, the methods presented herein may be carried out in any desired environment. It should also be noted that any aforementioned features may be used in any of the embodiments described in accordance with the various methods.

In operation 1402, a main pole adapted for producing a writing magnetic field is formed, such as above a nonmagnetic substrate. The main pole may comprise any suitable material, as known in the art.

In operation 1404, a trailing gap is formed on a trailing side of the main pole, the trailing gap comprising any suitable material, such as alumina, $SiO_2$, MgO, etc.

In operation 1406, a trailing shield is formed on a trailing side of the trailing gap. The trailing shield may comprise any suitable material as known in the art, such as magnetically permeable metal alloy materials.

In operation 1408, a side gap may be formed on a side of the main pole in a cross-track direction, the side gap comprising any suitable material, such as any dielectric like alumina, $SiO_2$, MgO, etc.

In operation 1410, a side shield is formed on at least one side of the side gap in the cross-track direction, with the main pole having an asymmetrical shape at an ABS thereof.

According to various embodiments, the main pole may be formed such that an angle at the ABS between a leading edge of the trailing shield and a shaped edge of the main pole is greater than 0° and less than about 90°, such as between about 30° and about 60° at the ABS, e.g., about 45° at the ABS.

In more approaches, the shaped edge may be located between a trailing edge of the main pole and a side edge of the main pole in a cross-track direction, and/or the main pole may be formed such that a corner of the main pole at the ABS between the trailing edge and the shaped edge of the main pole is positioned farther from a center of the main pole in a track-width direction than an edge of the trailing shield on a side thereof nearest to the shaped edge of the main pole, and/or the trailing shield may be formed such that a line extending along an edge of the trailing shield on a side thereof at the ABS nearest to the shaped edge of the main pole intersects with the main pole, and/or the trailing, shield may be formed such that an edge of the trailing shield on a side thereof nearest to the shaped edge of the main pole does not extend beyond the main pole in a cross-track direction.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
a main pole adapted for producing a writing magnetic field;
a trailing shield positioned on a trailing side of the main pole, wherein a trailing gap is positioned between the trailing shield and the main pole; and
a side shield positioned on at least one side of the main pole in a cross-track direction, wherein a side gap is positioned between the side shield and the main pole,
wherein an outer periphery of the main pole has an asymmetrical shape at an air bearing surface (ABS) thereof,
wherein the asymmetrical shape comprises four apexes, each apex having an angle of less than 180° measured in an interior of the outer periphery between intersecting sides of the main pole,
wherein at least three of the apexes are positioned on a centerline of the main pole and/or to a first side of the centerline of the main pole in a cross-track direction,.
wherein the shaped edge of the main pole is defined by being on the first side of the main pole between two adjacent apexes, and
wherein the shaped edge is located between and adjacent to a trailing edge of the main pole on the trailing side thereof and a side edge of the main pole on the first side thereof.

2. The magnetic head as recited in claim 1, wherein a first angle at the ABS between a leading edge of the trailing shield and a shaped edge of the main pole is greater than 0° and less than about 90°.

3. The magnetic head as recited in claim 2, wherein the first angle is greater than about 30° and less than about 60° at the ABS.

4. The magnetic head as recited in claim 2, wherein three apexes of the asymmetrical shape are positioned more toward the trailing side of the main pole than a leading side of the main pole.

5. The magnetic head as recited in claim 2, wherein a line extending in a down-track direction along the leading edge of the trailing shield intersects with the main pole.

6. The magnetic head as recited in claim 2, wherein the leading edge of the trailing shield on a side thereof nearest to the shaped edge of the main pole does not extend beyond the main pole in a cross-track direction.

7. The magnetic head as recited in claim 2, wherein a trailing edge of the side shield on a side thereof nearest to the shaped edge of the main pole does not extend beyond any portion of the shaped edge of the main pole in a down-track direction.

8. The magnetic head as recited in claim 2, wherein a trailing edge of the side shield on a side thereof nearest to the shaped edge of the main pole does not extend beyond a trailing edge of the main pole in a down-track direction.

9. A magnetic data storage system, comprising:
at least one magnetic head as recited in claim 1;
a magnetic medium;
a drive mechanism for passing the magnetic medium over the at least one magnetic head; and
a controller electrically coupled to the at least one magnetic head for controlling operation of the at least one magnetic head.

10. A method for forming a magnetic head, the method comprising:
forming a main pole adapted for producing a writing magnetic field;
forming a trailing gap on a trailing side of the main pole;
forming a trailing shield on a trailing side of the trailing gap;
forming a side gap on a side of the main pole in a cross-track direction; and forming a side shield on at least one side of the side gap in the cross-track direction,
wherein an outer periphery of the main pole has an asymmetrical shape at an air bearing surface (ABS) thereof,
wherein the asymmetrical shape comprises four apexes, each apex having an angle of less than 180° measured in an interior of the outer periphery between intersecting sides of the main pole, and
wherein three apexes of the asymmetrical shape are positioned more toward the trailing side of the main pole than a leading side of the main pole,
wherein the main pole is formed such that a first angle at the ABS between a leading edge of the trailing shield and a shaped edge of the main pole is greater than 0° and less than about 90°,
wherein the shaped edge of the main pole is defined by being on a first side of a centerline of the main pole in a cross-track direction between two adjacent apexes, and
wherein the shaped edge is located between and adjacent to a trailing edge of the main pole on the trailing side thereof and a side edge of the main pole on the first side thereof.

11. The method as recited in claim 10, wherein the first angle is greater than about 30° and less than about 60° at the ABS.

12. The method as recited in claim 10, wherein the angle is about 45° at the ABS, and wherein at least three of the apexes are positioned on the centerline of the main pole and/or to the first side of the centerline of the main pole in the cross-track direction.

13. The method as recited in claim 10, wherein the trailing shield is formed such that a line extending in a down-track direction along the leading edge of the trailing shield intersects with the main pole.

14. The method as recited in claim 10, wherein the trailing shield is formed such that the leading edge of the trailing shield on a side thereof nearest to the shaped edge of the main pole does not extend beyond the main pole in a cross-track direction.

15. The method as recited in claim 10, wherein the side shield is formed such that a trailing edge of the side shield on a side thereof nearest to the shaped edge of the main pole does not extend beyond any portion of the shaped edge of the main pole in a down-track direction.

\* \* \* \* \*

UNITED STATES PATENT AND TRADEMARK OFFICE
CERTIFICATE OF CORRECTION

PATENT NO. : 9,076,466 B2  
APPLICATION NO. : 13/722978  
DATED : July 7, 2015  
INVENTOR(S) : Yosuke Urakami et al.

Page 1 of 2

It is certified that error appears in the above-identified patent and that said Letters Patent is hereby corrected as shown below:

In the specification:

col. 1, line 22 replace "the rotating, disk" with --the rotating disk--;

col. 1, line 37 replace "recording hits" with --recording bits--;

col. 1, line 42 replace "overlapping, in as" with --overlapping in a--;

col. 1, line 61 replace "limiting, the" with --limiting the--;

col. 1, line 62 replace "to a minimum" with --to a minimum.--;

col. 2, line 8 replace "in another embodiment" with --In another embodiment,--;

col. 2, line 33 replace "in con unction" with --in conjunction--;

col. 2, line 37 replace "medium utilizing," with --medium utilizing--;

col. 3, line 64 replace "a trailing, gap" with --a trailing gap--;

col. 4, line 11 replace "disk HZ," with --disk 112,--;

col. 4, line 12 replace "read/write beads" with --read/write heads--;

col. 4, line 22-23 replace "as coil movable," with --a coil movable--;

col. 5, line 1 replace "has as pole" with --has a pole--;

col. 5, line 31 replace "in FIG. 20" with --in FIG. 2D--;

col. 5, line 42-43 replace "overlying coming" with --overlying coating--;

col. 5, line 50 replace "layer (PI) of" with --layer (P1) of--;

Signed and Sealed this  
Twenty-first Day of June, 2016

Michelle K. Lee  
*Director of the United States Patent and Trademark Office*

CERTIFICATE OF CORRECTION (continued)
U.S. Pat. No. 9,076,466 B2 col. 6, line 45 replace "shield 796 with" with --shield 706 with--;

col. 6, line 46 replace "pole 792," with --pole 702--;

col. 6, line 51 replace "hue between" with --line between--;

col. 6, line 53 replace "points SE" with --points E--;

col. 7, line 41 replace "cross-track, direction." with --cross-track direction.--;

col. 8, line 33 replace "one embodiment, a" with --one embodiment, α--;

col. 8, line 65 replace "the bead" with --the head--;

col. 9, line 10 replace "method 11400" with --method 1400--.